May 7, 1946.  R. STEWART ET AL  2,400,031
MOLDED, TAPERED TUBE
Filed Oct. 7, 1943  2 Sheets-Sheet 1
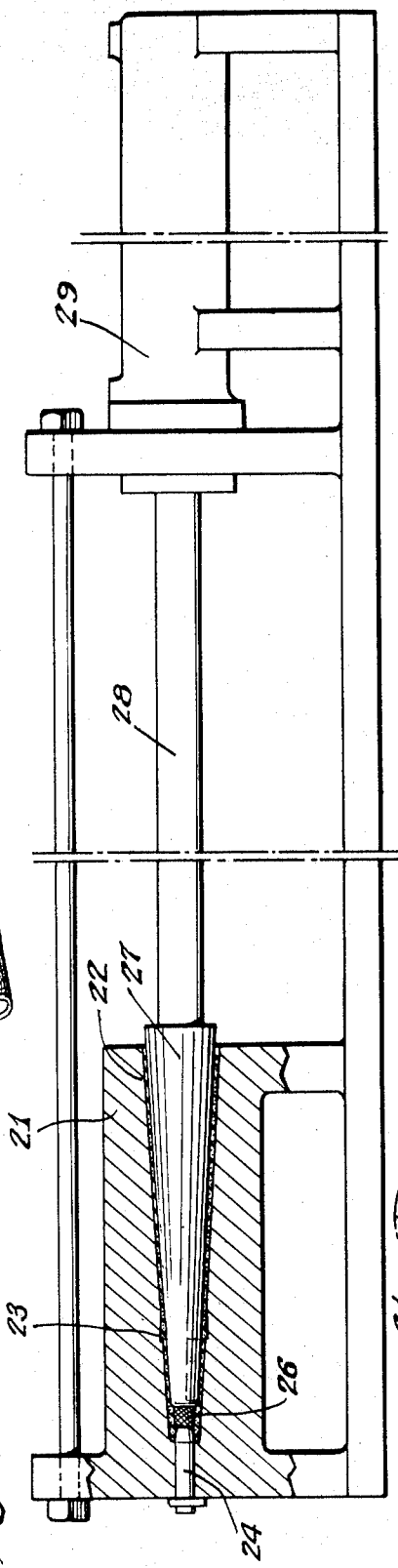
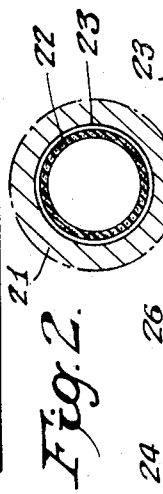
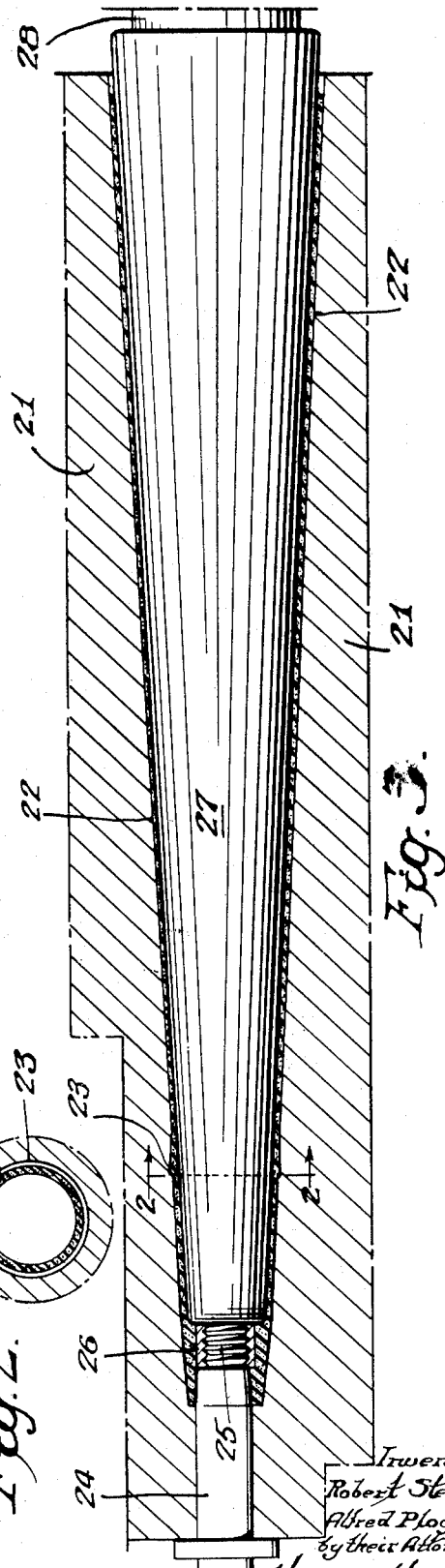
Inventors
Robert Stewart
Alfred Ploger
by their Attorneys
Howson & Howson May 7, 1946.  R. STEWART ET AL  2,400,031
MOLDED, TAPERED TUBE
Filed Oct. 7, 1943  2 Sheets-Sheet 2
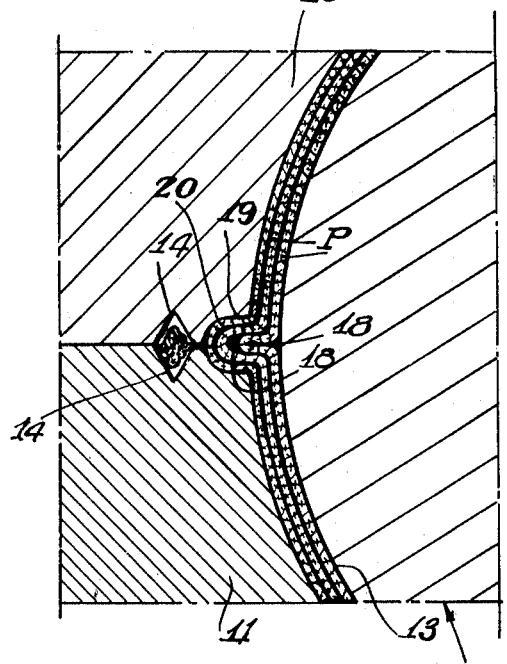
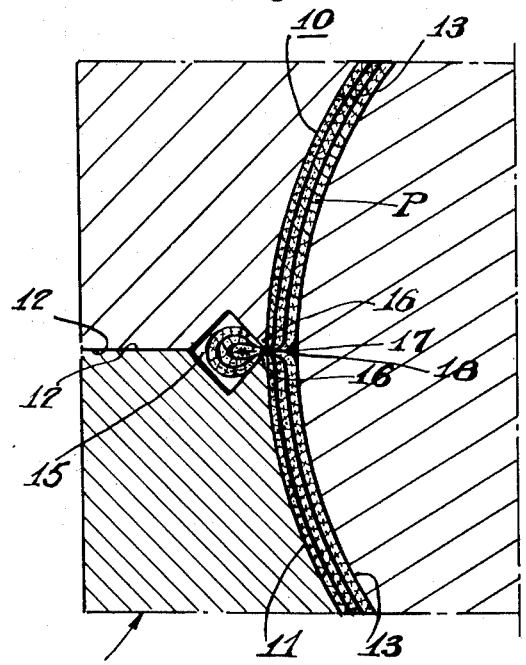
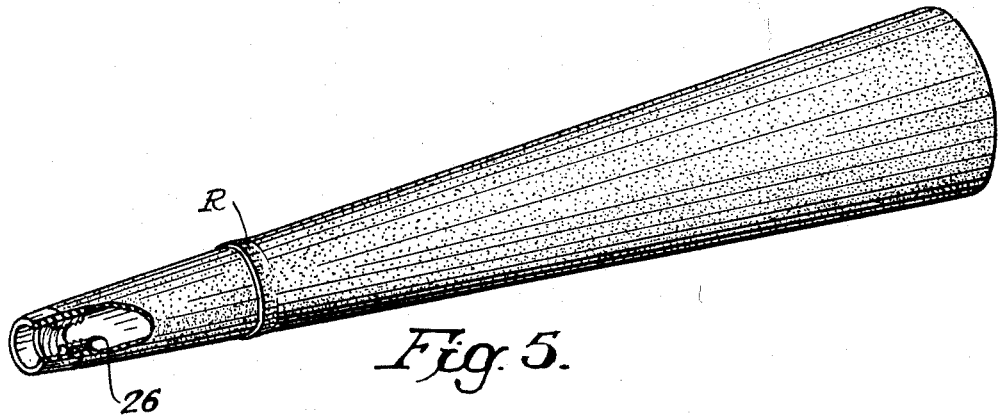
Inventors
Robert Stewart
Alfred Ploger
by their Attorneys
Howson & Howson Patented May 7, 1946

2,400,031

UNITED STATES PATENT OFFICE 2,400,031

MOLDED, TAPERED TUBE

Robert Stewart and Alfred Ploger, Newark, Del., assignors to Continental-Diamond Fibre Company, Newark, Del., a corporation of Delaware Application October 7, 1943, Serial No. 505,398

3 Claims. (Cl. 138—78)

This invention relates to molded longitudinally tapering tubes consisting of sheet material such as paper, fabric, asbestos, glass cloth, and the like or a combination of such materials impregnated with and bonded by a moldable material, such as moldable resinous material. An example of such a structure is to be found in the horns utilized in carbon dioxide fire extinguishing apparatus.

Such horns as heretofore constructed have been formed by winding impregnated sheet material upon a mandrel which is subsequently placed in a longitudinally slit two-part die of the "flash" type in which the horn is subjected to curing by heat and pressure. As is well known to those familiar with the art, the flash type die has in the meeting faces thereof, adjacent the edges of the mold cavity, grooves which receive excess material exuded in the curing process. The final movement of the die serves to sever or nearly sever the exuded materials from the formed object. In the case of a structure of the type under discussion, the product resulting from the use of such a mold is decidedly inferior, primarily due to the fact that in severing the exuded material or in subsequently removing the fin caused by the flash one or more plies of the sheet material employed, which give to the structure its main strength, are severed. Furthermore the closing of the die elements causes the plies at the joint to move radially with the result that at the line of juncture of the die faces there are formed radial resin pockets extending along the length of the article and which are of considerable depth, often extending through the entire finished product and consequently materially weakening the same. Attempts have been made to overcome this difficulty by forming such horns with longitudinal ribs in alignment with the die joint on the theory that by adopting this construction the radially projecting portions of the sheet material will be confined to the ribs and accordingly a substantial portion of their reinforcing qualities will be retained. This expedient is at best only partially successful since it has been found that without the use of an excessively large rib one or more of the plies are still severed at the seam and the radially extending resin pockets are still present to weaken the structure. Furthermore, any tube formed by this method must be subjected to a finishing step including the removal of the fin formed in molding with the consequent necessity for applying a finishing coating to the surface of the tube. Another difficulty arising in the production of fire extinguisher horns particularly lies in the fact that it is usually necessary to produce upon the horn an annular mounting rim and with the flash molding method, the production of such a rib involves careful placement of additional material in the rib site of the "preform."

An important object of this invention is the provision of a horn in which the sheet material is entirely in the form of annularly continuous plies and there are no resin pockets having a radial depth materially greater than the normal radial distance between adjacent plies, the molded article needs no extensive finishing and on which the mounting rib may be formed without any special disposition of the material of the "preform."

These and other objects we attain by the use of the apparatus illustrated in the accompanying drawings wherein for the purpose of illustration we have shown a preferred embodiment of our invention and wherein:

Figure 1 is a side elevation partially in section of an apparatus for constructing tapered tubes in accordance with our invention;

Figure 2 is a section on line 2—2 of Figure 3;

Figure 3 is an enlarged sectional view showing the mold and mandrel;

Figure 4 is a perspective view of the "preform";

Figure 5 is a perspective view, partially broken away, of the completed article and Figures 6 and 7 are fragmentary sectional views illustrating molds and tube constructions in accordance with the prior art.

Referring now to the drawings and more particularly to Figures 6 and 7 thereof wherein are illustrated examples of prior art constructions and the molds employed in producing the same, numerals 10 and 11 indicate mold sections, adjacent faces 12 of which are formed in parallelism to the mold cavity 13. The flash groove into which excess material of the "preform" from which the molded article is produced is exuded, is indicated at 15, it being understood that such flash cavities exist at both sides of the mold cavity. The exuded material is separated from that of the formed article during the final closing movement of the mold by the meeting of the cut-off surfaces indicated at 16, these surfaces either completely severing the exuded material or reducing the material between the molded article and exuded material to an extremely thin fin 17 which after the article is removed from the mold is then removed from the article.

As will have been noted from an examination of Figure 7 where the flash cavities are arranged immediately adjacent the edges of the mold cavity 13, the exuded material will usually include a number of plies P of the sheet material forming the reinforcement of the article and, in the case of an extremely thin walled article such as herein illustrated, all plies may be severed. Furthermore, in the displacement of the material under the ordinary molding pressures, which are usually between 1500 and 3000 pounds per square inch, the bonding synthetic resin and plies of material are both forced radially outwardly with the result that there are formed radial pockets of synthetic resin such as those indicated at 18, the depth of which will exceed considerably the distance between adjacent plies of the material and, as a matter of fact as illustrated, will often extend entirely through the seam joint. The completed article is, therefore, materially weakened at the seam both by the severing of the plies of the material and by the introduction at this joint of the resin pocket.

Attempts have been made to eliminate this weakness by modifying the flash mold as illustrated in Figure 6 in which it will be noted that the flash groove 14 has been spaced from the mold cavity proper and the faces of the mold sections are destroyed and there are still present the resin pockets 18 lending weakness to the completed article. Furthermore, with either type of mold the reinforcing sheet material is weakened and often torn due to the excessive molding pressures necessary.

In accordance with our invention, the plies of material which may be of any suitable nature, after impregnation with a moldable material, likewise of any suitable character, are preformed and subjected to heat and molding pressure in a unitary mold in which the pressure is applied in the direction of the axis of the tapered tube.

The "preform" may be made either spirally by wrapping the impregnated material directly on the mandrel utilized in the molding operation or by wrapping the same upon a separate mandrel and subsequently placing the "preform" in the mold or upon the mandrel of the molding apparatus.

A convenient form of molding apparatus is illustrated in Figures 1, 2 and 3 in which the numeral 21 designates the mold and 22 the mold chamber. This mold chamber as illustrated is formed from a single block of material and the bore thereof is circular in form. It will, however, be understood that in utilizing the term "unitary mold" it is not intended to convey that the mold should be formed from a single piece of material since obviously the tube to be formed may be non-circular and in many instances it will be economical to produce the mold in a plurality of sections which are subsequently unitarily connected to one another. The tapered wall of the bore of the mold chamber is provided at a desired location with an annular groove 23, this groove being at present shown as having its bottom wall parallel to the axis of the mold bore and merging with the wall of the main bore of the mold chamber at that end thereof more nearly adjacent the larger end of the mold chamber and as having the end wall thereof adjacent the smaller end of the mold chamber in the form of an abrupt shoulder.

The mold is likewise illustrated as equipped with a plug 24 fitting in the smaller end of the chamber and having at its inner end a threaded extension 25 which may be utilized either to form upon the interior of the smaller end of the horn a threaded surface for engagement with a supply line or as a means for mounting a bushing 26 which in the molding of the horn is engaged with and secured to the wall of the horn. Where the bushing 26 is employed, the outer surface thereof will be knurled or otherwise so constructed that the bushing will be firmly held in position in the molded structure.

Opposing the larger end of the mold chamber is a core mandrel 27 at present shown mounted on the ram 28 of a pressure cylinder 29. Assuming that the "preform" is made upon a forming mandrel, this "preform" may be either placed upon the mandrel 27 or in the mold chamber, following which pressure is applied through cylinder 29, the mold and/or ram being suitably heated by any preferred means not herein disclosed. The axial pressure necessary to secure proper molding conditions is considerably below that necessary in the flash type mold and well below the pressure which is dangerous to the ply material employed as a reinforcement. Exudation resulting during the molding operation will serve to insure molding of the material about the stem of plug 25 or about a bushing mounted thereon if such is employed and will furthermore express material into the groove 23, thus forming the mounting rib R.

It will be obvious that by use of the apparatus and method herein described, we are able to produce horns having no disfiguring seam marks and no weakness resulting from removal of projecting mold ribs. We are also able to produce the mounting rib R without any special wrapping operations such as has heretofore been necessary. The material with which the paper or fabric is impregnated, as above pointed out, may be any moldable material which becomes adhesive upon the application of heat, for example, a thermosetting or thermoplastic synthetic or natural resin or any other material having these properties. Advantageously, a thermosetting synthetic resin is employed in its partially cured state and in such a case the heating of the tube while under pressure is sufficient to cure or convert the resin to its infusible, insoluble stage.

We claim:

1. A tapered tube consisting of annularly continuous plies of sheet material bonded by a moldable resin, said tube having an annular rib intermediate the ends thereof, the outer wall of said rib being substantially parallel to the tube axis and merging at one end with the tube wall.

2. A tapered tube having seamless walls consisting of sheet material impregnated with and bonded by a moldable resin and free from resin pockets having a radial depth greater than the normal radial distance between adjacent plies of the material, said tube having an annular rib intermediate the ends thereof, the outer wall of said rib being substantially parallel to the tube axis and merging at one end with the tube wall.

3. A molded tapered tube having walls free from seams or seam marks consisting of radially compressed sheet material impregnated with and bonded by a converted moldable resin in which the resin impregnated material has flowed during molding to conform to the mold, said tube being formed in a seamless mold by axial pressure on a tapered mandrel whereby said tube is free from extruded resin pockets.

ROBERT STEWART.
ALFRED PLOGER.